(12) United States Patent
Kobayashi

(10) Patent No.: US 10,832,604 B2
(45) Date of Patent: Nov. 10, 2020

(54) VIDEO MONITORING METHOD, DISPLAY DEVICE, AND DISPLAY SYSTEM

(71) Applicant: NEC Display Solutions, Ltd., Tokyo (JP)

(72) Inventor: Hironori Kobayashi, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 152 days.

(21) Appl. No.: 16/094,531

(22) PCT Filed: Apr. 22, 2016

(86) PCT No.: PCT/JP2016/062761
§ 371 (c)(1),
(2) Date: Oct. 18, 2018

(87) PCT Pub. No.: WO2017/183183
PCT Pub. Date: Oct. 26, 2017

(65) Prior Publication Data
US 2019/0139469 A1    May 9, 2019

(51) Int. Cl.
*G09G 3/00* (2006.01)
*G09G 3/36* (2006.01)
*H04N 17/04* (2006.01)

(52) U.S. Cl.
CPC .............. *G09G 3/006* (2013.01); *G09G 3/36* (2013.01); *G09G 3/3648* (2013.01);
(Continued)

(58) Field of Classification Search
CPC ........ G09G 3/006; G09G 3/36; G09G 3/3648; H04N 17/04; H04N 2201/0001
See application file for complete search history.

(56) References Cited

U.S. PATENT DOCUMENTS 6,839,055 B1 * 1/2005 Nguyen ................. G09G 3/006
345/204
6,930,664 B2 * 8/2005 Kim ....................... G09G 3/006
345/214
(Continued)

FOREIGN PATENT DOCUMENTS

JP    H 02-034893 A    2/1990
JP    2005-173143 A    6/2005
(Continued)

OTHER PUBLICATIONS

International Search Report (ISR) (PCT Form PCT/ISA/210), in PCT/JP2016/062761, dated Aug. 2, 2016.

*Primary Examiner* — Sardis F Azongha
(74) *Attorney, Agent, or Firm* — McGinn IP Law Group, PLLC

(57) ABSTRACT

A display device includes a signal detector for detecting gradation pixel data input to a display having multiple pixels, a current detector for detecting currents supplied to at least part of the pixels included in the multiple pixels, and an output part for outputting current data corresponding to currents supplied to the part of the pixels and signal data corresponding to gradation pixel data used for the part of the pixels. Accordingly, it is possible to compare current data with signal data, and therefore, it is possible to confirm whether or not video signals are correctly displayed on a screen.

14 Claims, 13 Drawing Sheets

(52) U.S. Cl.
CPC ....... *H04N 17/04* (2013.01); *G09G 2320/029* (2013.01); *G09G 2330/12* (2013.01)

(56) References Cited

U.S. PATENT DOCUMENTS

| | | | |
|---|---|---|---|
| 8,914,246 B2* | 12/2014 | Chaji | G09G 3/006 |
| | | | 702/58 |
| 9,208,732 B2* | 12/2015 | Kim | G09G 3/36 |
| 9,837,006 B2* | 12/2017 | Hwang | G09G 3/3611 |
| 2005/0093567 A1* | 5/2005 | Nara | G09G 3/3216 |
| | | | 324/762.09 |
| 2010/0283858 A1* | 11/2010 | Katchan | G09G 5/006 |
| | | | 348/189 |
| 2010/0301876 A1* | 12/2010 | Hartrampf | G09G 3/006 |
| | | | 324/656 |
| 2016/0189620 A1* | 6/2016 | Park | G09G 3/3258 |
| | | | 345/690 |

FOREIGN PATENT DOCUMENTS

| | | |
|---|---|---|
| JP | 2011-003439 A | 1/2011 |
| JP | 2011-508901 A | 3/2011 |
| JP | 2011-095804 A | 5/2011 |

\* cited by examiner

VIDEO MONITORING METHOD, DISPLAY DEVICE, AND DISPLAY SYSTEM

TECHNICAL FIELD

The present invention relates to a video monitoring method, a display device, and a display system.

BACKGROUND ART

For the purpose of replacing conventional advertising measures using print media with other advertising measures, engineers have developed advertising display devices configured to display videos of advertising contents for large-size display devices. It is very important for advertisement providers who provide advertising content and pay advertising costs and for advertiser sides for displaying adverting media to confirm whether intended advertising content has been displayed in a desired manner when displaying advertising content with advertising display devices.

For the purpose of confirming the aforementioned circumstances, Patent Literature Document 1 discloses a display device externally equipped with a camera configured to capture and record advertising content displayed on a screen, thus confirming circumstances as to whether intended content has been displayed in a desired manner.

CITATION LIST

Patent Literature Document

Patent Literature Document 1: Japanese Patent Application Publication No. 2011-95804

SUMMARY OF INVENTION

Technical Problem

However, the display device as disclosed in Patent Literature Document 1 may suffer from problems, e.g. it is necessary to secure a remote place for externally setting up a camera which is separated from the display device by a certain distance, and the manufacturing cost of a display system should be increased due to an expensive camera.

The problem for the present invention is to provide a video monitoring method, which can prove whether video signals are correctly displayed on a screen at a low cost.

Solution to Problem

The present invention relates to a video monitoring method including a signal detecting process configured to detect gradation pixel data input to a display having a plurality of pixels, a current detecting process configured to detect a current supplied to at least part of pixels included in the plurality of pixels, and an output process configured to output current data corresponding to the current supplied to part of pixels and signal data corresponding to the gradation pixel data used for part of pixels.

The present invention relates to a display device including a signal detector configured to detect gradation pixel data input to a display having a plurality of pixels, a current detector configured to detect a current supplied to at least part of pixels included in the plurality of pixels, and an output part configured to output current data corresponding to the current supplied to part of pixels and signal data corresponding to the gradation pixel data used for part of pixels.

The present invention relates to a display system including a video transmission part configured to output a video signal, a signal detector configured to detect gradation pixel data included in the video signal input to a display having a plurality of pixels, a current detector configured to detect a current supplied to at least part of pixels included in the plurality of pixels, and an output part configured to output current data corresponding to the current supplied to part of pixels and signal data corresponding to the gradation pixel data used for part of pixels.

Advantageous Effects of Invention

The present invention includes a signal detecting process for detecting gradation pixel data input to a display having multiple pixels, a current detecting process for detecting currents supplied to at least part of the pixels included in multiple pixels, and an output process for outputting current data corresponding to currents supplied to the part of the pixels and signal data corresponding to gradation pixel data used for the part of the pixels. Accordingly, it is possible to compare current data with signal data, and therefore, it is possible to confirm whether or not video signals are correctly displayed on a screen. In addition, it is possible to reduce costs.

DESCRIPTION OF EMBODIMENTS

First Embodiment

Figure 1:
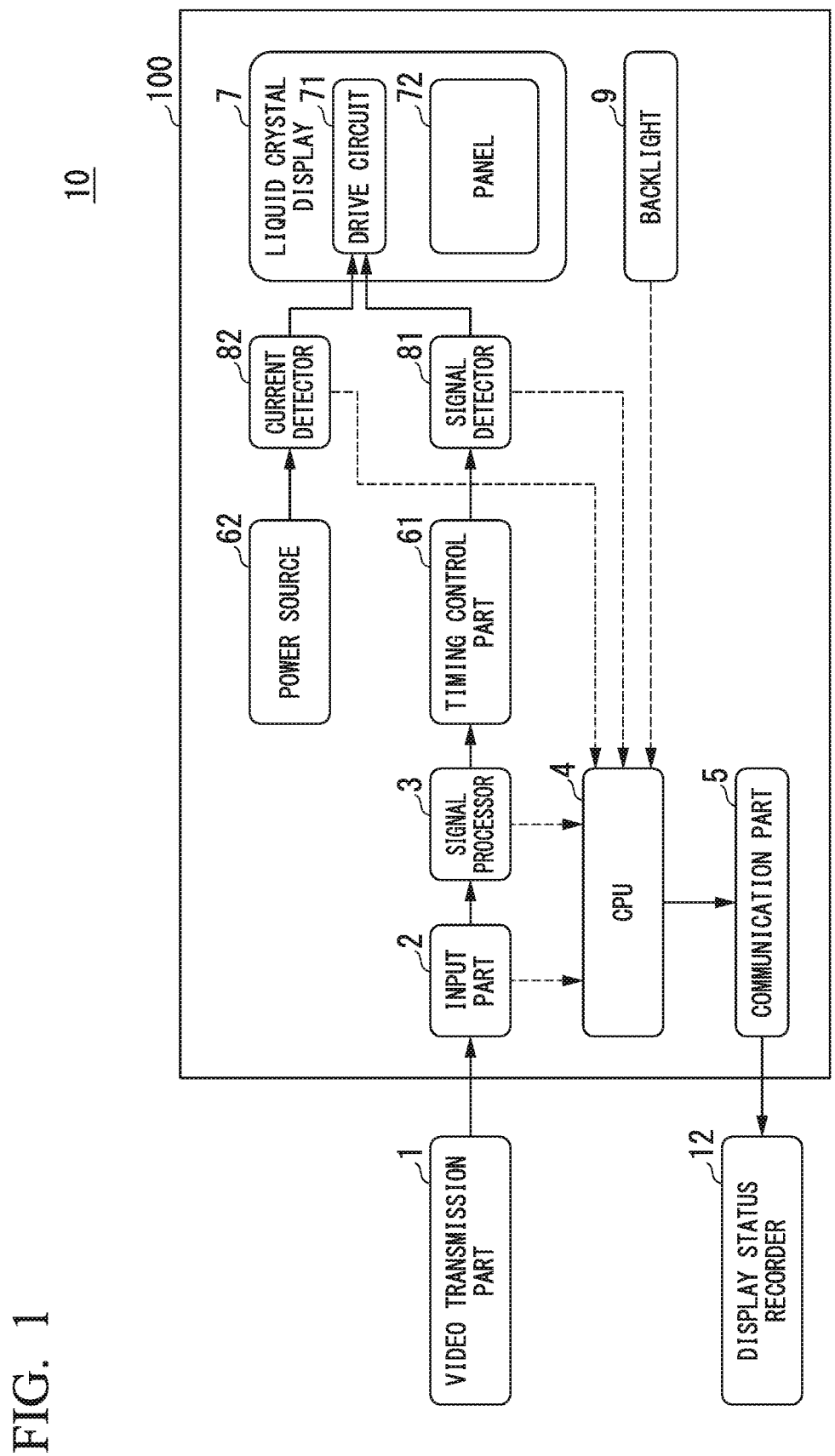
FIG. 1 is a block diagram showing the configuration of a display system according to the first embodiment of the present invention.

Hereinafter, a display system according to one embodiment of the present invention will be described with reference to the drawings. FIG. 1 is a block diagram showing the configuration of a display system according to the first embodiment of the present invention.

A display system 10 includes a video transmission part 1, a video display device 100 (i.e. a video signal monitoring device), and a display status recorder 12.

The video display device 100 (or a display device) includes an input part 2, a signal processor 3, a CPU (Central Processing Unit) 4 (or a determination part), a communication part 5, a timing control part 61, a power source 62, a liquid crystal display 7, a signal detector 81 (or an output part), a current detector 82 (or an output part), and a backlight 9.

The input part 2 sends video signals, which are transmitted thereto from the video transmission part 1 provided externally to the video display device 100, to the signal processor 3.

The signal processor 3 starts its processing for each frame period to thereby carry out a process for converting video signals into gradation pixel data D0 to be displayed using multiple liquid-crystal pixels of the panel 72 under the control of the timing control part 61 (or a process for generating gradation pixel data) based on multiple pixel data D1 included in video signals input to the input part 2. For example, multiple pixel data D1 will be updated in a single frame period.

The timing control part 61 transmits multiple control signals (i.e. a horizontal synchronization signal HSTB and a vertical synchronization signal VSTB) to a drive circuit 71 together with gradation pixel data D0. Accordingly, the drive circuit 71 outputs data-signal source voltages, corresponding to gradation pixel data D0, to data lines of liquid-crystal pixels in the panel 72.

The power source 62 supplies power, which is used for the drive circuit 71 to output data-signal source voltages corresponding to gradation pixel data D0, to the drive circuit 71.

The signal detector 81 is interposed between the timing control part 61 and the drive circuit 71 in order to detect gradation pixel data in a horizontal period (or a predetermined period) of a video signal (details will be discussed later).

The current detector 82 is interposed between the power source 62 and the drive circuit 71 in order to detect a current in a horizontal period (details will be discussed later).

The CPU 4 determines whether or not an input terminal matches a display terminal according to the status of signals (or the status) output from the input part 2 and the signal processor 3. The CPU 4 controls the communication part 5 to transmit its determination result (e.g. a determination result 1) to the display status recorder 12 arranged externally of the video display device 100.

In addition, the CPU 4 determines whether or not the backlight 9 is turned on according to a lighting status output from the backlight 9. The CPU 4 controls the communication part 5 to transmit its determination result (i.e. a determination result 2) to the display status recorder 12.

Moreover, the CPU 4 determines whether or not a variation of a signal level in a horizontal period of a video signal detected by the signal detector 81 matches current data (i.e. a current consumed to display an image corresponding to gradation pixel data) detected by the current detector 82 in a horizontal period within the entirety of a predetermined range of determination with respect to one frame. The CPU 4 controls the communication part 5 to transmit its determination result (i.e. a determination result 3) to the display status recorder 12.

The display status recorder 12 stores the determination results 1-3 for each status in a predetermined interval of time (e.g. one minute). The display status recorder 12 may be a memory (or a storage area) connectible to the video display device 100 such as an SD (Secure Digital) card, a PC (Personal Computer) like the video transmission part 1, or any other means included in the video transmission part 1. A user (or an advertiser) may confirm whether or not video signals are displayed on the liquid crystal display 7 at the correct timing for a predetermined period of time based on the determination results 1-3 for each status stored on the display status recorder 12.

Figure 2:
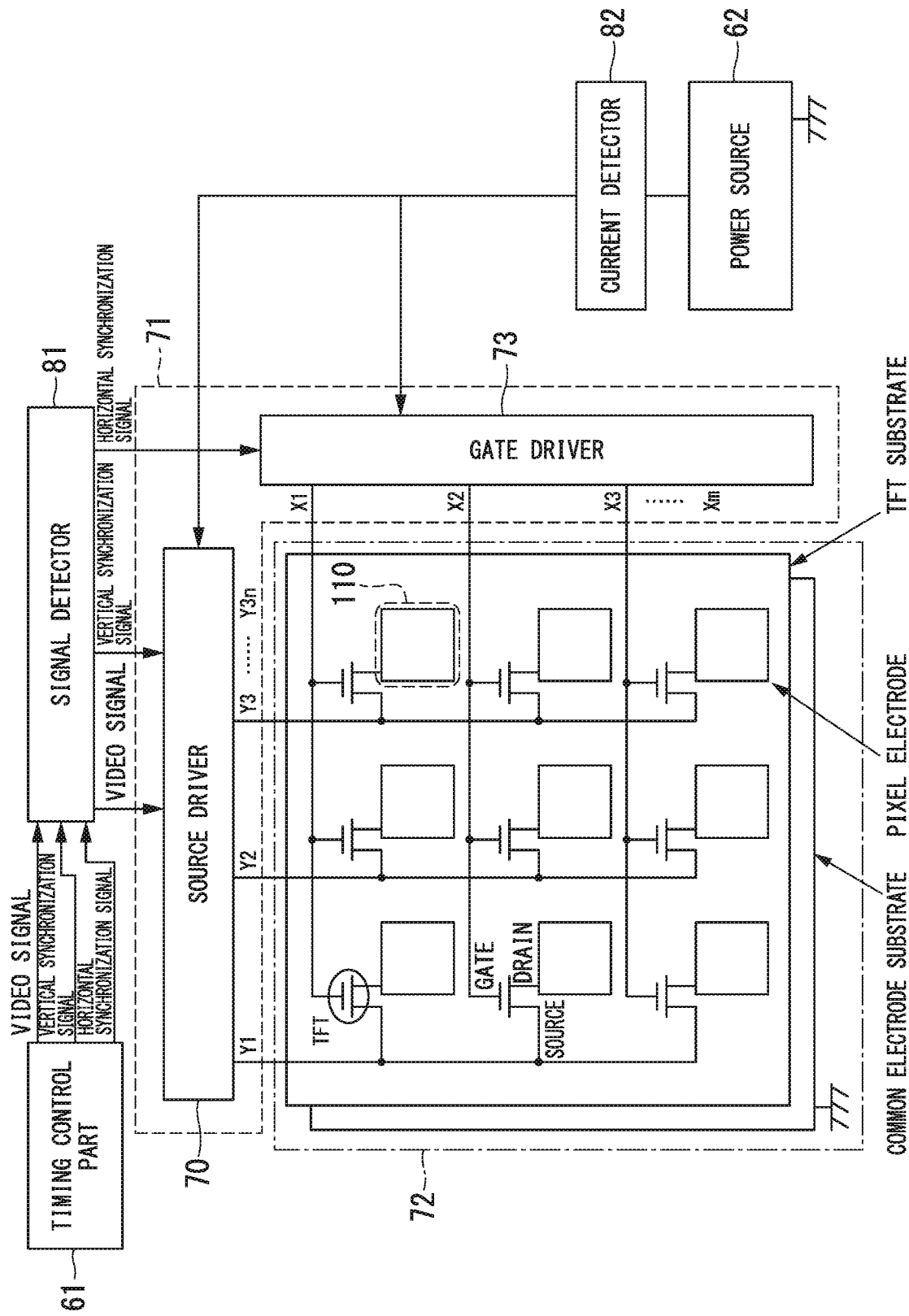
FIG. 2 is a block diagram showing the configuration of a timing control part, a signal detector, a power source, a current detector, and a liquid crystal display shown in FIG. 1.

FIG. 2 is a block diagram showing the configuration of pixel electrodes, liquid-crystal molecules, and a common electrode in a panel shown in FIG. 1.

The liquid crystal display 7 includes a source driver 70, the panel 72, and a gate driver 73.

The panel 72 includes a plurality of pixels 110 aligned in a matrix. All the pixels 110 have the same configuration. The panel 72 includes a plurality of gate lines (or scanning lines), i.e. m gate lines X1 through Xm (where m is an integer equal to or greater than two) aligned and extended in an x-axis direction in FIG. 2.

In addition, the panel 72 includes a plurality of data lines, i.e., 3n rows of data lines Y1 through Y3 (where n is an integer equal to or greater than two) in groups of three rows and extended in a y-axis direction in FIG. 2.

Moreover, a plurality of pixels 110 are disposed at intersections between the m gate lines and the 3n rows of data lines. Herein, three pixels 110 disposed at intersections between one gate line and three rows of data lines correspond to three pixels colored R (red), G (green), and B (blue), which collectively represent one dot of pixel for a color image.

Under the control of the vertical synchronization signal VSTB for controlling the start timing of fetching one frame of pixel data being transmitted from the timing control part 61, the gate driver 73 sequentially selects a plurality of gate lines X1 through Xm for displaying gradation in a one-frame period. The gate driver 73 supplies an ON signal to the selected gate line X as a drive signal to conduct TFTs in each line for one horizontal period.

Under the control of the horizontal synchronization signal HSTB for controlling the start timing of fetching one line of pixel data being transmitted from the timing control part 61, the source driver 70 supplies a current, corresponding to a data-signal source voltage, to pixels through a plurality of data lines Y1 through Y3n for a one-line period.

Figure 3:
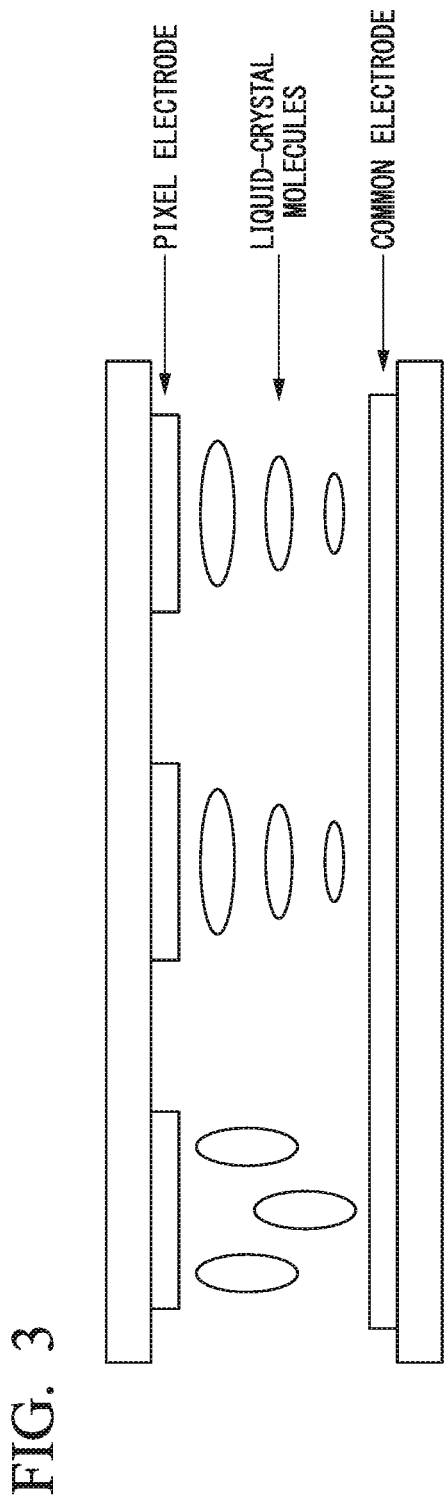
FIG. 3 is a schematic diagram showing the configuration of pixel electrodes, liquid-crystal molecules, and a common electrode in a panel shown in FIG. 1.

FIG. 3 is a schematic diagram showing the configuration of pixel electrodes, liquid-crystal molecules, and a common electrode in the panel 72 shown in FIG. 1. As shown in FIG. 3, liquid-crystal molecules are changed in a direction corresponding to a voltage difference between each pixel electrode and the common electrode and orientation polarization representing properties of liquid-crystal molecules.

The lives of the pixels 110 of the panel 72 are shorted when they are driven by direct currents; hence, they are driven by alternating currents upon applying alternating voltages alternating about a common voltage Vcom for a frame period.

Figure 4:
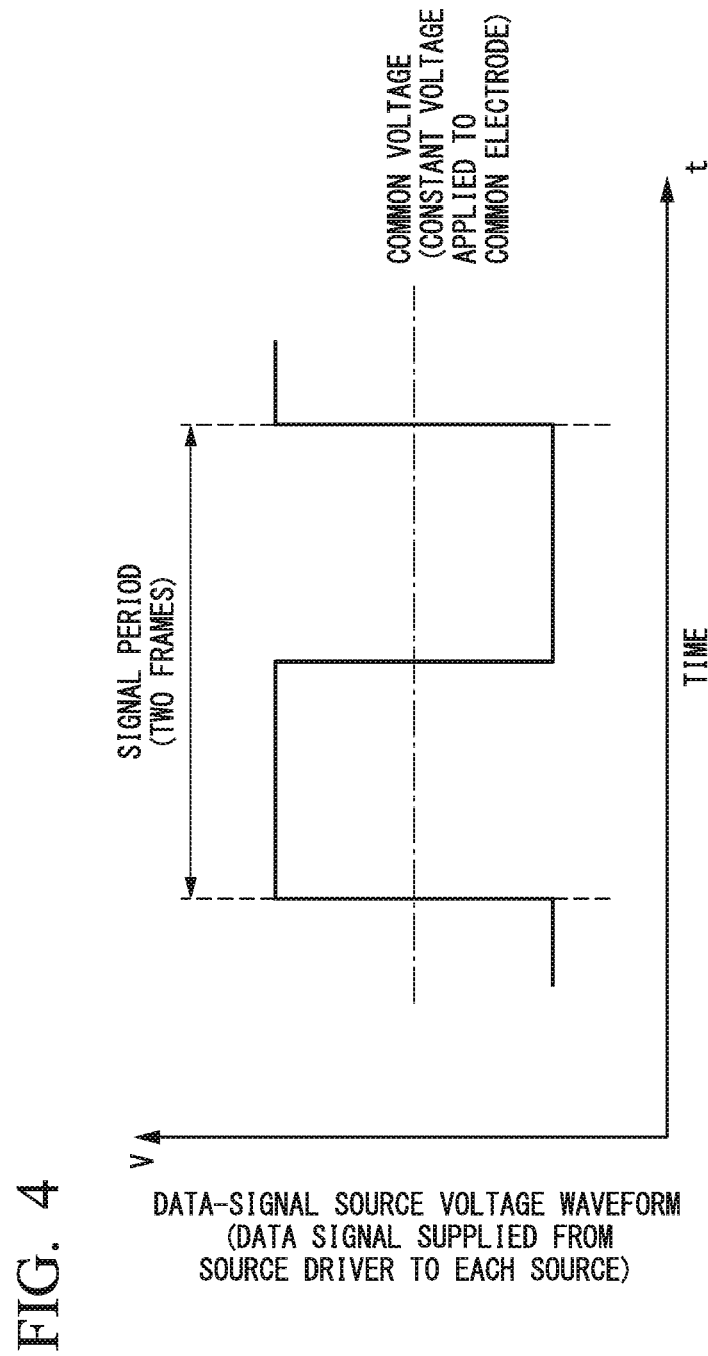
FIG. 4 is a graph showing the relationship between a common voltage and a data-signal source voltage when applying an alternating-current voltage (or a data-signal source voltage) to each of pixel electrodes in a panel as well as a signal period of a data-signal source voltage.

FIG. 4 is a graph showing the relationship between a common voltage and a data-signal source voltage as well as the signal period of a data-signal source voltage when an alternating voltage (or a data-signal source voltage) is applied to each of pixel electrodes in a panel. As shown in FIG. 4, after a data-signal source voltage higher than the common voltage Vcom is applied to the pixel 110 of the panel 72 at a first frame, a data-signal source voltage lower than the common voltage Vcom is applied to the pixel 110 at a second frame indicated by a changing point between frames. Accordingly, liquid-crystal molecules are changed in a direction corresponding to a voltage difference between each pixel electrode and the common electrode and orientation polarization representing properties of liquid-crystal molecules (see FIGS. 6-7).

Figure 5:
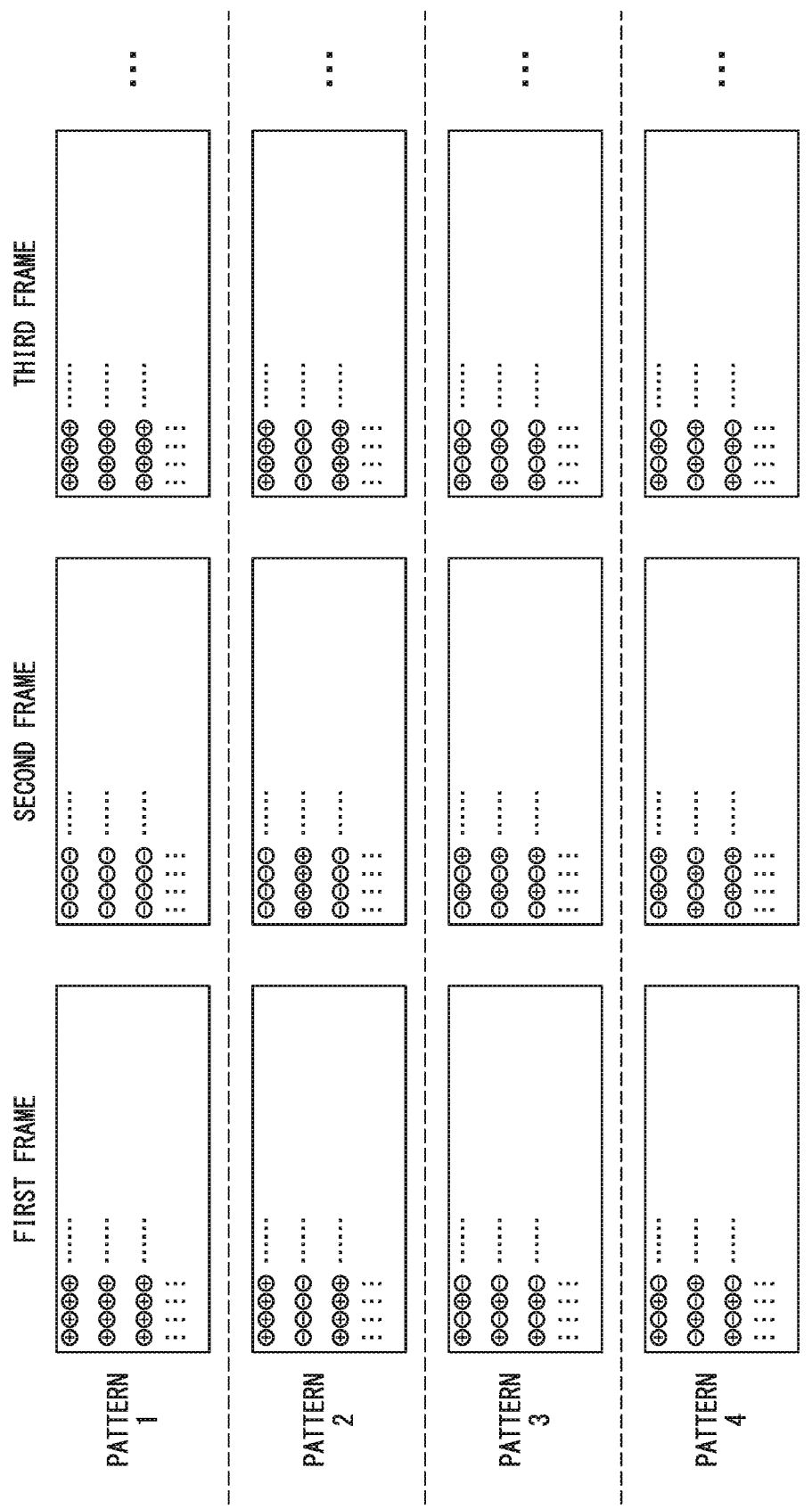
FIG. 5 is a schematic diagram showing polarities of data-signal source voltages applied to pixels of a panel.

FIG. 5 is a schematic diagram showing polarities of data-signal source voltages applied to each pixel in a panel. In FIG. 5, polarities of data-signal source voltages applied to one line of pixels in the same horizontal period are shown in an x-axis direction. Herein, one line corresponds to one of gate lines X1-Xm shown in FIG. 2; hence, the gate lines X1-Xm are sequentially aligned from the top to the bottom of FIG. 5. Within one line of pixels, the pixels 110 connected to the data line Y1 through the pixels 110 connected to the data line Y3n are sequentially aligned from the left to the right of FIG. 5.

In this connection, a symbol "+" depicted in a circle mark (hereinafter, simply referred to as a symbol "+") indicates the polarity of a data-signal source voltage applied to each pixel higher than the common voltage Vcom. In addition, a symbol "−" depicted in a circle mark (hereinafter, simply referred to as a symbol "−") may indicates the polarity of a data-signal source voltage applied to each pixel lower than the common voltage Vcom.

In addition, FIG. 5 shows patterns 1-4 as methods of driving alternating currents.

As shown in FIG. 5, the drive circuit 71 alternately outputs positive and negative polarities for each frame so as to write data into each pixel. Accordingly, each TFT will be turned on for one horizontal period, and therefore, it is possible to apply alternating currents to each pixel according to patterns 1-4.

Figure 6:
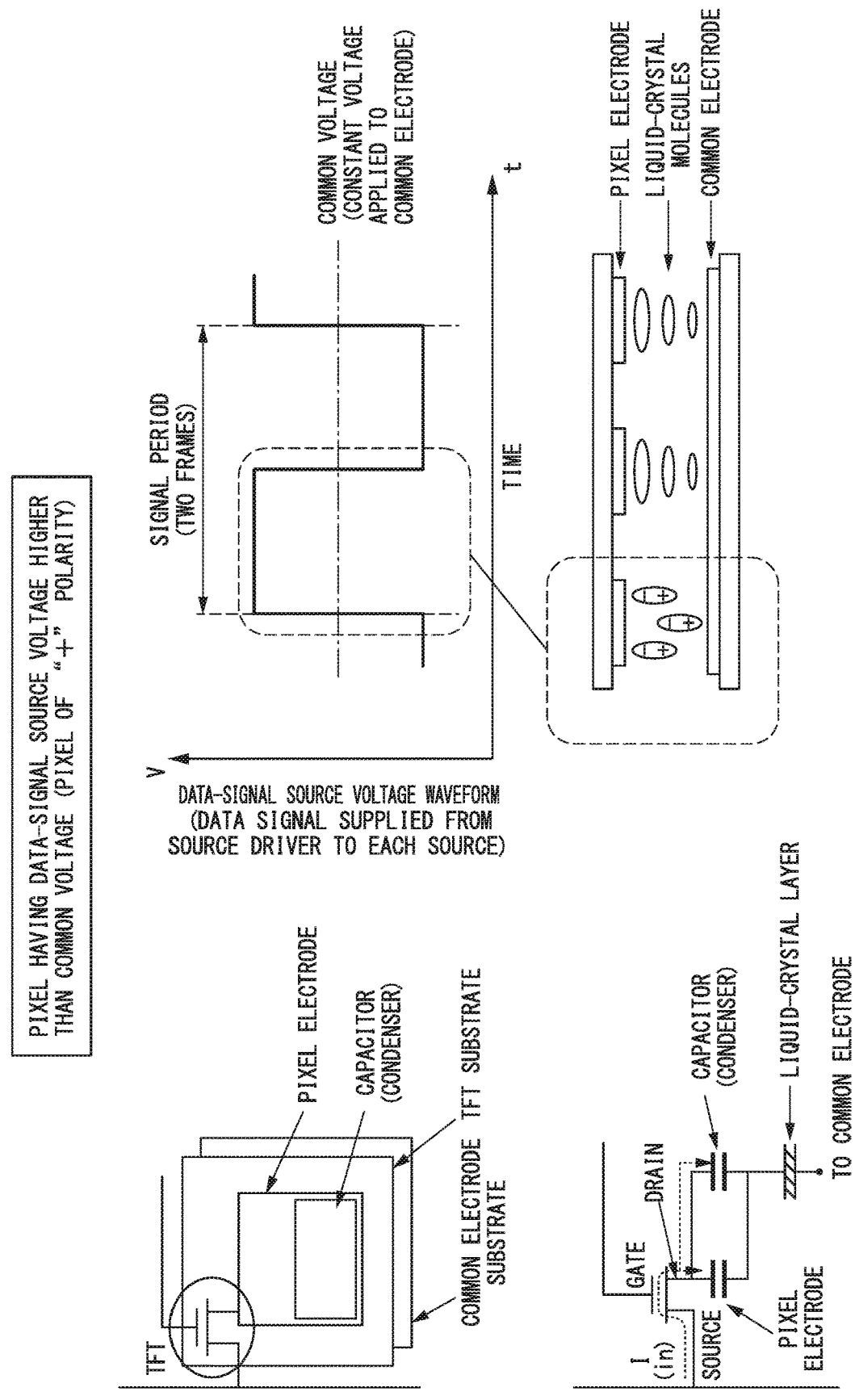
FIG. 6 shows the relationship between a pixel electrode of one pixel 110, a capacitor, a TFT substrate, a liquid crystal layer, and a common electrode in a panel 72, and shows directions of liquid-crystal molecules for pixels supplied with data-signal source voltages higher than a common voltage.

FIG. 6 shows the relationship between a pixel electrode of one pixel 110, a capacitor, a TFT substrate, a liquid-crystal layer, and a common electrode in the panel 72. It shows a direction of liquid-crystal molecules for a pixel supplied with a data-signal source voltage higher than the common voltage.

A pixel electrode of one pixel 110 includes a TFT, a pixel electrode, a capacitor, a liquid-crystal layer, and a common electrode.

The gate of a TFT is connected to the gate driver 73, the source is connected to the source driver 70, and the drain is connected to the pixel electrode and the capacitor.

The capacitor is used to maintain a voltage at the pixel electrode for one frame.

When changing the pixel 110 from negative drive to positive drive, a current I (in) flows into VDD of the drive circuit 71 due to a current that flows into the capacitor of the pixel 110 when the TFT of the pixel 110 is turned on.

The current detector 82 detects a variation of the current I (in) flowing into the capacitor and the pixel electrode through the source line from the source driver 70.

Figure 7:
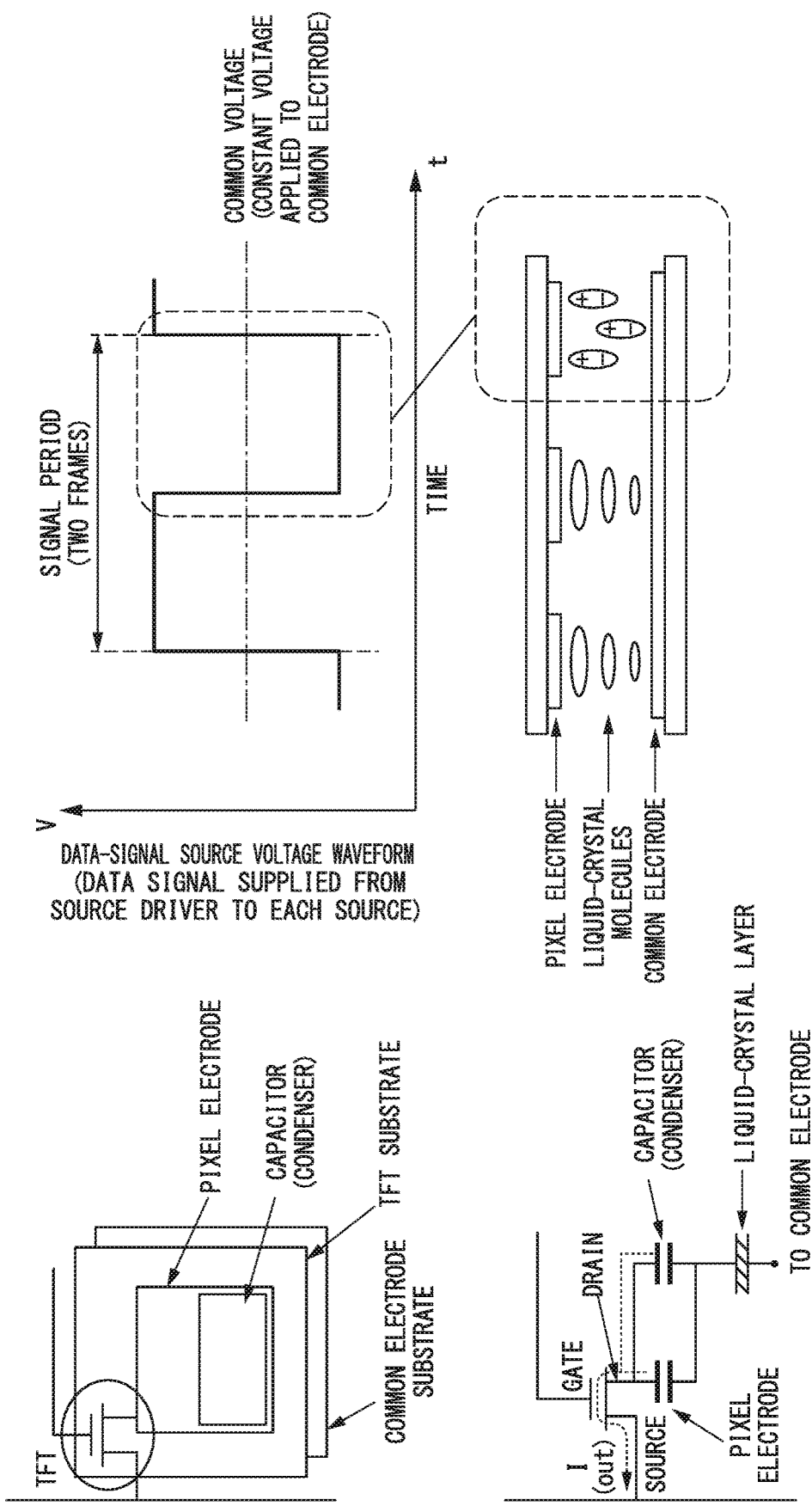
FIG. 7 shows the relationship between a pixel electrode of one pixel 110, a capacitor, a TFT substrate, a liquid-crystal layer, and a common electrode in a panel, and shows directions of liquid-crystal molecules for pixels supplied with data-signal source voltages lower than a common voltage.

FIG. 7 shows the relationship between a pixel electrode of one pixel 110, a capacitor, a TFT substrate, a liquid-crystal layer, and a common electrode in the panel 72. It shows a direction of liquid-crystal molecules for a pixel supplied with a data-signal source voltage higher than the common voltage.

A pixel electrode of one pixel 110 includes a TFT, a pixel electrode, a capacitor, a liquid-crystal layer, and a common electrode.

The gate of a TFT is connected to the gate driver 73, the source is connected to the source driver 70, and the drain is connected to the pixel electrode and the capacitor.

The capacitor is used to maintain a voltage at a pixel electrode for one frame.

When changing the pixel 110 from positive drive to negative drive, a current I (out) flows into GND of the drive circuit 71 due to a charged current of the capacitor of the pixel 110 that flows out when the TFT of the pixel 110 is turned on.

The current detector 82 cannot detect the current I (out) flowing between the pixel 110 and the GND of the drive circuit 71.

As shown in FIG. 2, one line of pixels of the panel 72 includes $3n$ pixels 110 aligned in a horizontal direction; hence, a drive voltage is applied to all the pixels in one line (or a word line) since TFTs are concurrently turned on (ON) at the timing of the horizontal synchronization signal HSTB. This allows a current $\Sigma I$ (in) to flow according to the status of a one-line video.

Returning to FIG. 1, the signal detector 81 is interposed between the timing control part 61 and the liquid crystal display 7 in the video display device 100 while the current detector 82 is interposed between the power source 62 and the liquid crystal display 7, thus determining whether an input video is correctly displayed on the liquid crystal display 7 based on information stored in corresponding parts.

Figure 8:
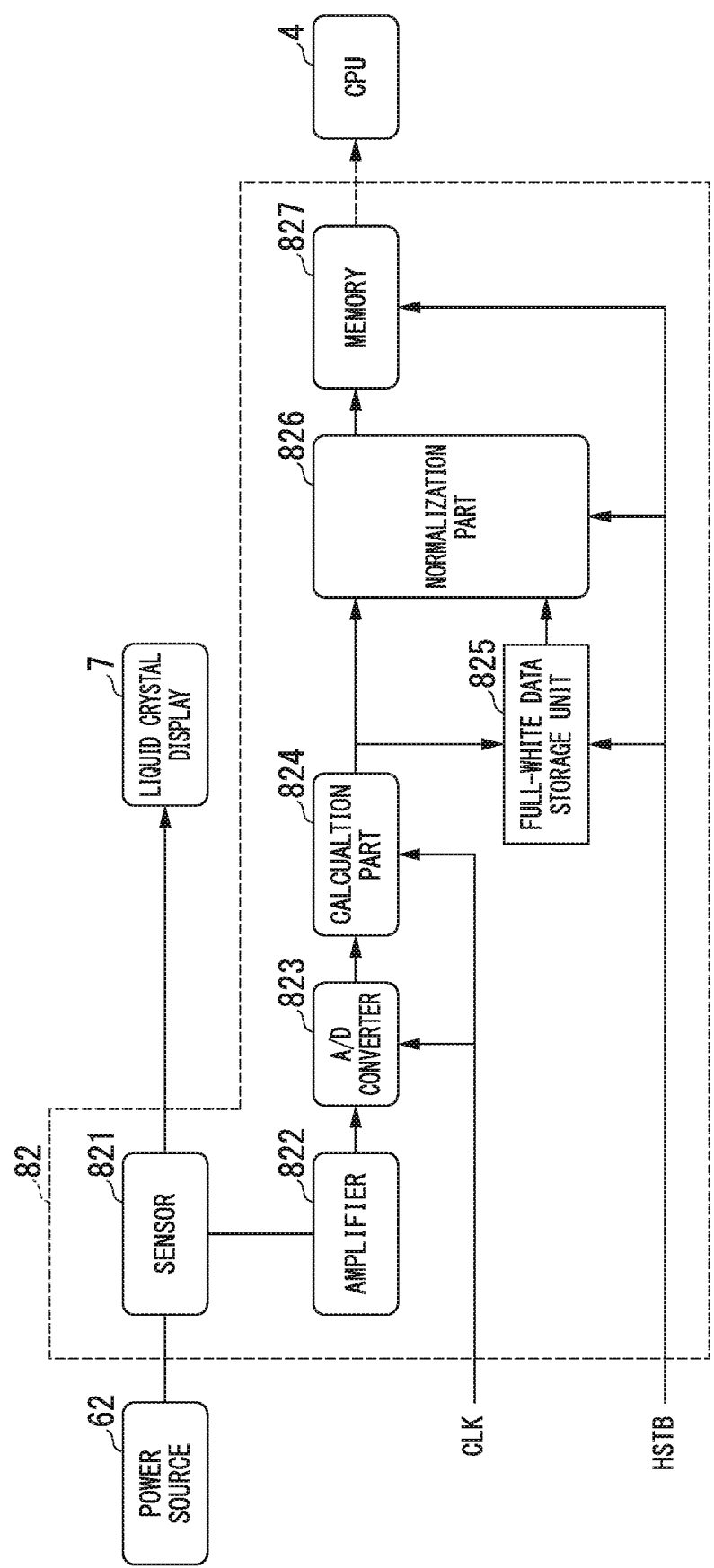
FIG. 8 is a block diagram showing the configuration of a current detector shown in FIG. 1.

FIG. 8 is a block diagram showing the configuration of the current detector 82. The current detector 82 includes a sensor 821, an amplifier 822, an A/D converter 823, a calculation part 824, a full-white data storage unit 825, a normalization part 826, and a memory 827 (a storage area).

In the current detector 82, the sensor 821 (or a current sensor) is disposed at the power source (VDD) applied to the drive circuit 71; a sensed signal is amplified by the amplifier 822; amplified data is subjected to A/D conversion by the A/D converter 823; and then, the calculation part 824 produces summation of currents in a horizontal period. The normalization part 826 normalizes the summation of currents in a horizontal period with respect to summation of current data in a horizontal period, which was produced by way of measurement using full-white signals and then stored on the full-white data storage unit 825. The normalized data is stored on the memory 827. The normalized data is stored on the memory 827 in connection with a serial number of each horizontal line.

The sensor 821 detects a value of a current which flows from the power source 62 to the liquid crystal display 7. Herein, the sensor 821 is configured to solely detect a current value for a pixel subjected to positive-polarity writing (see FIGS. 6-7).

The amplifier 822 amplifies a current value detected by the sensor 821.

The A/D converter 823 converts the current value amplified by the amplifier 822 from an analog value to a digital value.

The calculation part 824 produces summation of current values in one horizontal period. The calculation part 824 produces summation of current values by adding up the currents I (in) shown in FIG. 6.

The full-white data storage unit 825 has stored summation of currents in a horizontal period by conducting measurement using full-white signals in advance.

The normalization part 826 normalizes the summation of current values in one horizontal period, which is produced by the calculation part 824, with respect to the full-white data stored on the full-white data storage unit 825.

For each horizontal period, the normalization part 826 carries out the foregoing operation in association with the full-white data storage unit 825, thus storing data of one frame (i.e. a frame subjected to detection) on the memory 827. Herein, the normalized data is stored on the memory 827 in connection with a serial number of each horizontal line (1 through m). In the case of a panel having a resolution of 1920×1080, for example, it is possible to obtain 1,080 (=m) normalized data for one frame.

Figure 9:
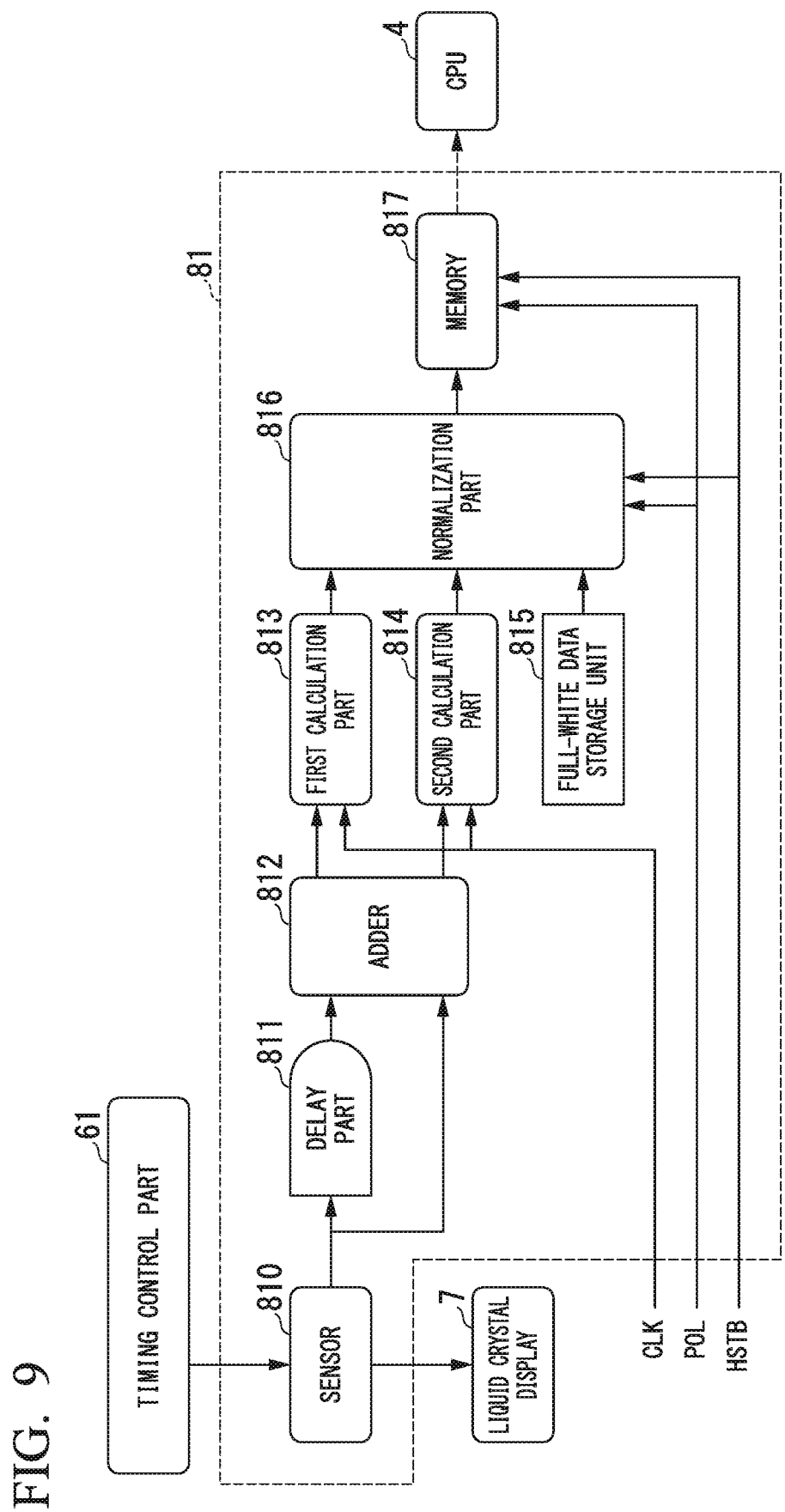
FIG. 9 is a block diagram showing the configuration of a signal detector shown in FIG. 1.

FIG. 9 is a block diagram showing the configuration of the signal detector 81 shown in FIG. 1. The signal detector 81 includes a sensor 810, a delay part 811, an adder 812, a first calculation part 813, a second calculation part 814, a full-white data storage unit 815, a normalization part 816, and a memory 817 (a storage area).

The signal detector 81 includes the delay part 811 for delaying its input signal by one frame according to signals (i.e. gradation pixel data D0) output from the timing control part 61, thus adding an (n−1) frame (i.e. a referenced frame) and an n frame (i.e. detected frame) together. Herein, n is a natural number equal to or greater than two.

As described in FIG. 6, the (n−1) frame differs from the n frame in polarity, and therefore, the current I (in) needed for a pixel having a (+) polarity to change its gradation should be summation of current values at the (n−1) frame and the n frame. That is, the current detector 82 is configured to detect current data corresponding to the summation of current values at the (n−1) frame and the n frame.

Accordingly, the delay part 811 and the adder 812 of the signal detector 81 add the (n−1) frame and the n frame in terms of gradation. That is, a variation between signal levels corresponding to signal data should be summation of signals at the (n−1) frame and the n frame.

According to the pattern 4 shown in FIG. 5, the panel 72 includes a line (X=1) for writing a positive polarity at a first pixel (Y=1) and a negative polarity at a second pixel (Y=2), and another line (X=2) for writing a negative polarity at a first pixel (Y=1) and a positive polarity at a second pixel (Y=2).

That is, the panel 72 includes a line (X=1) for writing a positive polarity at odd-numbered dots (Y=1, 3, 5, . . . ) and another line (X=2) for writing a positive polarity at even-numbered dots (Y=2, 4, 6, . . . )

The aforementioned property shows that the summation of signal data at pixels for writing a positive polarity in each line is correlated to currents flowing into the drive circuit 71.

Therefore, the first calculation part 813 calculates gradation at first pixels having a positive polarity while the second calculation part 814 calculates gradation at first pixels having a negative polarity. Each of the calculation parts 813-814 produces summation of gradation for one horizontal period.

The full-white data storage unit 825 has stored summation of gradation for one horizontal period, which was produced by way of measurement using white signals in advance.

The normalization part 816 subtracts gradation at odd-numbered dots for writing a negative polarity and gradation at even-numbered dots for writing a negative polarity from the summation of gradation for one horizontal period calculated by the first calculation part 813, thus producing summation of signal data at pixels for writing a positive polarity in each line. Subsequently, the normalization part 816 normalizes the full-white data stored on the full-white data storage unit 815 and thereby stores the normalized data on the memory 817.

The normalization part 816 subtracts gradation at odd-numbered dots for writing a negative polarity and gradation at even-numbered dots for writing a negative polarity from the summation of gradation for one horizontal period calculated by the second calculation part 814, thus producing summation of signal data at pixels for writing a positive polarity in each line. Subsequently, the normalization part 816 normalizes the full-white data stored on the full-white data storage unit 815 and thereby stores the normalized data on the memory 817.

The normalized data are stored on the memory 817 in connection with their serial numbers of horizontal lines (1-m).

The CPU 4 acquires the normalized data and the data corresponding to the number of lines (i.e. horizontal-line numbers 1-m) stored on the memory 827 of the current detector 82 and the memory 817 of the signal detector 81 in each vertical period. The CPU 4 compares the normalized data produced by the current detector 82 with the normalized data produced by the signal detector 81, which may serve as a basis of comparison, and thereby determines that input signals of a panel are correctly displayed on screen when the normalized data matches. Herein, the CPU 4 conducts comparison between normalized data for each line and thereby determines that images are correctly displayed on screen when the normalized data matches in all the lines.

In the determination process described above, the current detector 82 detects currents which may include errors of measurement due to its device performance, and therefore, it is necessary to prevent an erroneous operation in the determination process by setting a determination range in advance. The display status is updated by carrying out the determination process in an interval of time corresponding to each horizontal period. When the n frame is subjected to comparison, for example, it is possible to determine whether or not video signals are consecutively displayed on a screen multiple times by increasing n to be three or more.

Figure 10:
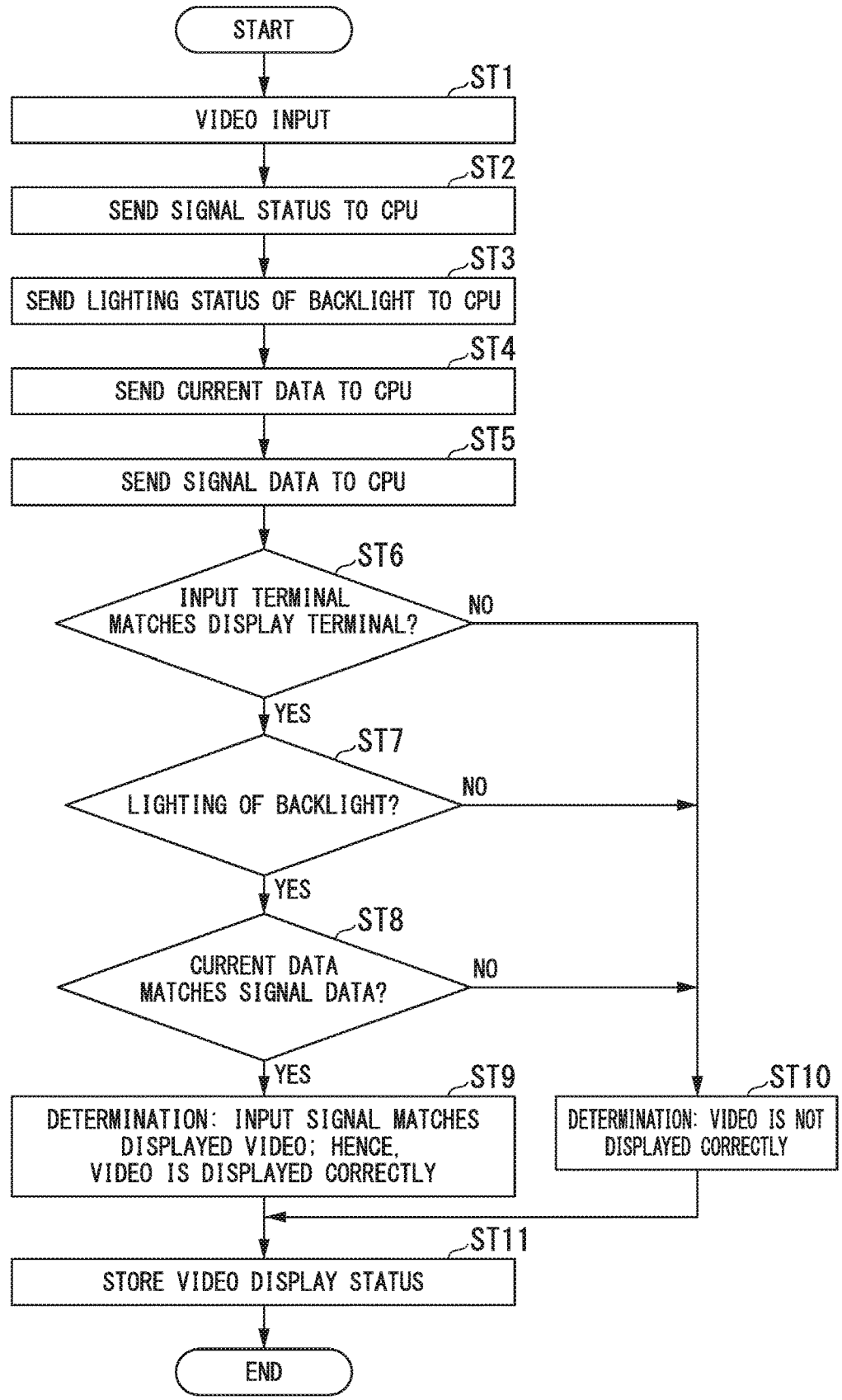
FIG. 10 is a flowchart showing a control method of the display system according to the first embodiment of the present invention.

FIG. 10 is a flowchart showing a control method of the display system according to the first embodiment of the present invention.

First, the video transmission part 1 sends video signals to the video display device 100 (step ST1).

The input part 2 and the signal processor 3 send the signal status to the CPU 4 (step ST2).

The backlight 9 sends the lighting status to the CPU 4 (step ST3).

The current detector 82 sends current data (i.e. normalized current data) to the CPU 4 (step ST4).

The signal detector 81 sends signal data (i.e. normalized signal data) to the CPU 4 (step ST5).

The CPU 4 determines whether or not an input terminal matches a display terminal according to the signal status output from the input part 2 and the signal processor 3 (step ST6).

The CPU 4 proceeds to step ST7 when the input terminal matches the display terminal (i.e. step ST6—YES). Alternatively, the CPU 4 proceeds to step ST10 when the input terminal does not match the display terminal (i.e. step ST6—NO).

The CPU 4 determines whether or not the backlight 9 is turned on according to the lighting status output from the backlight 9 (step ST7).

The CPU 4 proceeds to step ST8 when the backlight 9 is turned on (i.e. step ST7—YES). Alternatively, the CPU 4 proceeds to step ST10 when the backlight 9 is not turned on (i.e. step ST7—NO).

The CPU 4 determines whether or not current data matches signal data (step ST8).

The CPU 4 proceeds to step ST9 when current data matches signal data (step ST8—YES). Alternatively, the CPU 4 proceeds to step ST10 when current data does not match signal data (step ST8—NO).

In step ST9, the CPU 4 determines that a video is correctly displayed on the screen because a displayed video matches an input signal. In step ST10, the CPU 4 determines that a video is not correctly displayed on the screen.

The CPU 4 controls the communication part 5 to transmit the determination result of steps ST6 through ST8 (i.e. the determination result 1-3) to the display status recorder 12.

The display status recorder 12 stores the determination result 1-3, corresponding to each status, in a predetermined interval of time. Based on the determination result 1-3 corresponding to each status stored by the display status recorder 12, a user (or an advertiser) is able to confirm whether or not video signals are displayed on the liquid crystal display 7 at the correct timing for a predetermined period of time.

Second Embodiment

Figure 11:
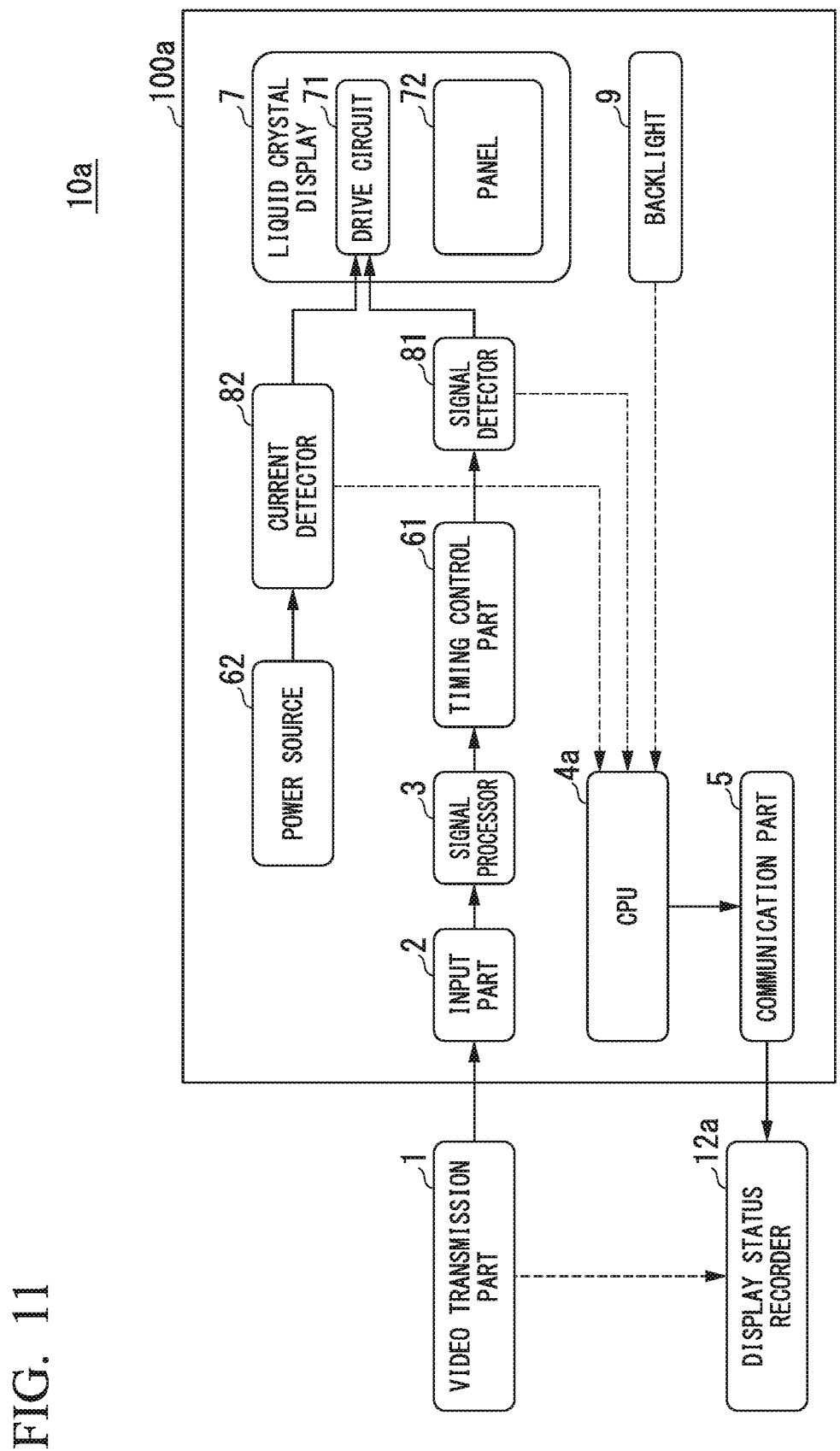
FIG. 11 is a block diagram showing the configuration of a display system according to the second embodiment of the present invention.

FIG. 11 is a block diagram showing the configuration of a display system according to the second embodiment of the present invention.

A display system 10a includes the video transmission part 1, a video display device 100a (i.e. a video signal monitoring device), and a display status recorder 12a (i.e. a determination part).

The video display device 100a (i.e. a display device) includes the input part 2, the signal processor 3, a CPU 4a (i.e. an output part), the communication part 5, the timing control part 61, the power source 62, the liquid crystal display 7, the signal detector 81, the current detector 82, and the backlight 9.

In FIG. 11, the same parts in FIG. 1 are denoted using the same reference signs; hence, their detailed descriptions will be omitted here.

In the display system 10 shown in FIG. 1, the CPU 4 acquires the normalized data and the data corresponding to the number of lines (i.e. horizontal-line numbers 1-$m$) stored on the memory 827 of the current detector 82 and the memory 817 of the signal detector 81 in each vertical period. The CPU 4 compares the normalized data produced by the current detector 82 with the normalized data produced by the signal detector 81, which may serve as a basis of comparison, and thereby determines that an input signal of a panel is correctly displayed on a screen when the normalized data matches. In contrast, the display system 10a is designed such that the CPU 4a controls the communication part 5 to transmit the normalized data produced by the signal detector 81 and the normalized data produced by the current detector 82 in each vertical period to the display status recorder 12a.

Accordingly, the display status recorder 12a determines whether or not the signal data detected by the signal detector 81 in each horizontal period of video signals matches the current data detected by the current detector 82 in each horizontal period of video signals with respect to one frame in the entirety of the predetermined range of determination. The CPU 4 produces this determination result as a determination result 3a.

Video signals output from the video transmission part 1 are directly input to the display status recorder 12a. The display status recorder 12a carries out the same process as that of the signal detector 81 of the video display device 100a with respect to video signals directly input thereto from the video transmission part 1, thus producing normalized data.

Subsequently, the display status recorder 12a determines whether or not signal data corresponding to video signals input to the video display device 100a matches signal data corresponding to video signals input to the display status recorder 12a. Accordingly, the display status recorder 12a may determine whether video signals input thereto will reach the liquid crystal display 7 according to the signal status output from the video transmission part 1. This determination result will be referred to as a determination result 1a.

In addition, the CPU 4a controls the communication part 5 to transmit the lighting status, which is transmitted thereto from the backlight 9, to the display status recorder 12a.

Accordingly, the display status recorder 12a determines whether or not the backlight 9 is turned on according to the lighting status output from the backlight 9. This determination result will be referred to as a determination result 2a.

The display status recorder 12a stores the determination result 1a-3a corresponding to each status in a predetermined interval of time (e.g. one minute). The display status recorder 12a may be a memory such as an SD card. Alternatively, the display status recorder 12a may be a PC like the video transmission part 1, or it may be included in the video transmission part 1. Based on the determination result 1a-3a corresponding to each status stored on the display status recorder 12a, a user (or an advertiser) can confirm whether or not video signals are displayed on the liquid crystal display 7 at the correct timing for a predetermined period of time.

Figure 12:
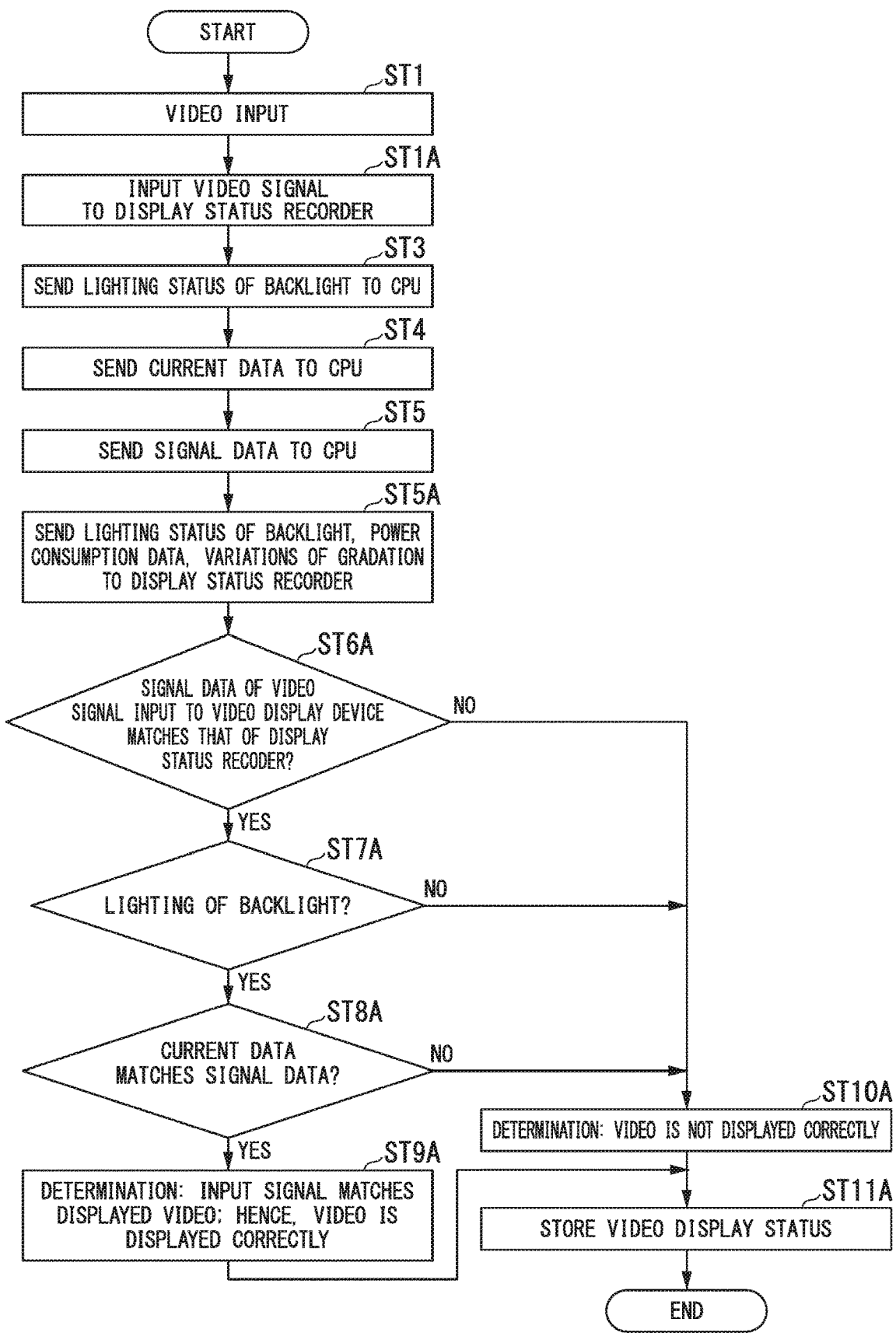
FIG. 12 is a flowchart showing a control method of the display system according to the second embodiment of the present invention.

FIG. 12 is a flowchart showing a control method of the display system according to the second embodiment of the present invention.

The video transmission part 1 sends a video signal (hereinafter, referred to as a video signal 1) to the video display device 100 (step ST1).

In addition, the video transmission part 1 sends a video signal (hereinafter, referred to as a video signal 2) to the display status recorder 12a (step ST1A). The display status recorder 12a carries out the same process as that of the signal detector 81 of the video display device 100a with respect to the video signal 2 directly input thereto from the video transmission part 1, thus producing normalized data.

The backlight 9 sends its lighting status to the CPU 4a (step ST3).

The current detector 82 sends current data (i.e. normalized current data) to the CPU 4a (step ST4).

The signal detector 81 sends signal data (i.e. normalized signal data) to the CPU 4a (step ST5).

The CPU 4*a* sends the lighting status of the backlight 9, the current data, and the signal data to the display status recorder 12*a* (step ST5A).

The display status recorder 12*a* determines whether or not the signal data corresponding to the video signal 1 input to the video display device 100*a* matches the signal data corresponding to the video signal 2 input to the display status recorder 12*a* (step ST6A).

The display status recorder 12*a* proceeds to step ST7A when the signal data of the video signal 1 matches the signal data of the video signal 2 (i.e. step ST6A—YES). Alternatively, the display status recorder 12*a* proceeds to step ST10 when the signal data of the video signal 1 does not match the signal data of the video signal 2 (i.e. step ST6A—NO).

The display status recorder 12*a* determines whether or not the backlight 9 is turned on according to the lighting status output from the CPU 4*a* (step ST7A).

The display status recorder 12*a* proceeds to step ST8A when the backlight 9 is turned on (i.e. step ST7A—YES). Alternatively, the display status recorder 12*a* proceeds to step ST10A when the backlight 9 is not turned on (i.e. step ST7A—NO).

The display status recorder 12*a* determines whether or not the current data matches the signal data (step ST8A).

The display status recorder 12*a* proceeds to step ST9A when the current data matches the signal data (step ST8A—YES). Alternatively, the display status recorder 12*a* proceeds to step ST10A when the current data does not match the signal data (i.e. step ST8A—NO).

In step ST9A, the display status recorder 12*a* determines that a video is correctly displayed on a screen because a displayed video matches an input signal thereof. In step ST10A, the display status recorder 12*a* determines that a video is not correctly displayed on a screen.

The display status recorder 12*a* stores the determination result (i.e. the determination result 1*a*-3*a*) in steps ST6A through ST8A in a predetermined interval of time. Based on the determination result 1*a*-3*a* corresponding to each status stored on the display status recorder 12*a*, a user (or an advertiser) may confirm whether or not the video signal 1 is displayed on the liquid crystal display 7 at the correct timing for a predetermined period of time.

In addition, it is possible to obtain the determination result 1*a*-3*a* using the CPU 4*a* having a smaller load of processing than the CPU 4.

Figure 13:
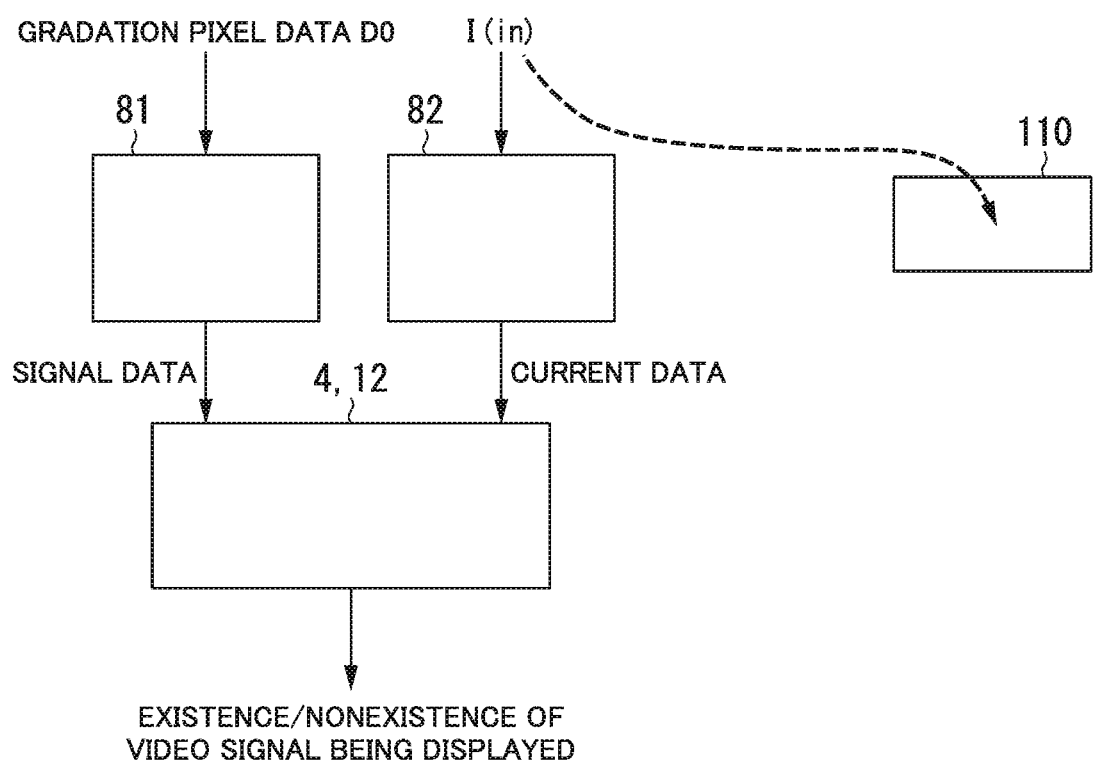
FIG. 13 is a schematic diagram for explaining the characterizing part of the present invention.

FIG. 13 is a schematic diagram for explaining the characterized part of the present invention.

The signal detector 81 detects the gradation pixel data D0 input to a display having multiple pixels in a signal detecting process.

The current detector 82 detects the current I (in) supplied to at least part of pixels (e.g. pixels aligned in each row) included in multiple pixels in a current detecting process.

Thus, it is possible for a device (e.g. the CPU 4 or the display status recorder 12) receiving an output signal from an output part to make determination by comparing the current data ΣI (in) corresponding to the current I (in) with the signal data corresponding to the gradation pixel data D0.

As described above, the present invention includes a signal detecting process for detecting gradation pixel data input to a display having multiple pixels, a current detecting process for detecting currents supplied to at least part of the pixels included in the multiple pixels, and an output process for outputting current data corresponding to currents supplied to the part of the pixels and signal data corresponding to gradation pixel data used for the part of the pixels.

Accordingly, the present invention provides a video monitoring method or the like configured to prove that video signals are correctly displayed on a screen at a lower cost than a conventional method using a camera.

The present invention has been described with reference to the preferred embodiments; however, the present invention is not necessarily limited to the foregoing embodiments and their variations. It is possible to make any addition of configuration, deletion, replacement, and modification without departing from the subject matter of the invention. In addition, the present invention is not necessarily limited to the foregoing descriptions, and therefore, the present invention should be solely limited by the scope of the appended claims.

For example, it is possible to realize ten combinations of placement configured to implement the signal detector 81 and the current detector 82 according to the first and second embodiments, which will be described below.

It is possible to realize three patterns of placement for implementing the signal detector 81, i.e. a placement of the signal detector 81 embedded inside the timing control part 61, a placement of the signal detector 81 embedded inside the drive circuit 7, and a placement of the signal detector 81 solely interposed between the timing control part 61 and the drive circuit 71.

It is possible to realize three patterns of placement for implementing the current detector 82, i.e. a placement of the current detector 82 embedded inside the power source 62, a placement of the current detector 82 embedded inside the drive circuit 71, and a placement of the current detector 82 solely interposed between the power source 62 and the drive circuit 71.

Accordingly, it is possible to realize nine combinations of placement for implementing the signal detector 81 and the current detector 82 in total.

In addition, it is possible to realize another pattern of placement for implementing both the signal detector 81 and the current detector 82 on the same substrate.

As described above, it is possible to realize ten combinations of placement in total, i.e. a method of implementing both the signal detector 81 and the current detector 82 on the same substrate in addition to nine combinations of placement, i.e. three patterns of placement for implementing the signal detector 81, and three patterns of placement for implementing the current detector 82.

In this connection, it is possible to store programs achieving functions of the video display device 100 or the video display device 100*a* on computer-readable storage media, to load programs stored on storage media into the CPU 4 or the CPU 4*a*, and to thereby execute programs, thus implementing a current detecting process of the current detector 82 and a signal detecting process of the signal detector 81. Herein, the term "computer system" may include an OS and hardware such as peripheral devices.

The term "computer system" using a WWW system may include homepage-providing environments (or homepage-displaying environments).

In addition, the term "computer-readable storage media" may refer to flexible disks, magneto-optical disks, ROM, portable media such as CD-ROMs, and storage devices such as hard disks embedded inside computer systems. Moreover, the term "computer-readable storage media" may include any measures for holding programs for a predetermined time such as volatile memories (RAMs) embedded inside computer systems serving as servers or clients upon receiving programs transmitted thereto through networks such as the Internet or communication lines such as telephone lines. The foregoing programs may achieve part of the foregoing functions, or they may achieve the foregoing functions when combined with pre-installed programs of computer systems. <Appendix> It is possible to provide a video signal monitoring program causing a computer to implement a signal detecting process for detecting gradation pixel data input to a display having multiple pixels, a current detecting process for detecting currents supplied to at least part of the pixels included in the multiple pixels, and an output process for outputting current data corresponding to currents supplied to the part of the pixels and signal data corresponding to gradation pixel data used for the part of the pixels.

INDUSTRIAL APPLICABILITY

According to the foregoing embodiments regarding a video monitoring method or the like, it is possible to provide a video monitoring method or the like configured to prove that video signals are correctly displayed on a screen at a lower cost than a conventional method of using a camera.

REFERENCE SIGNS LIST 1 video transmission part
2 input part
3 signal processor
4, 4a CPU
5 communication part
7 liquid crystal display
9 backlight
10, 10a display system
12, 12a display status recorder
61 timing control part
62 power source
81 signal detector
82 current detector
100, 100a video display device

The invention claimed is:

1. A video monitoring method comprising:
    detecting gradation pixel data input to a display having a plurality of pixels;
    detecting a current supplied to part of pixels among the plurality of pixels; and
    outputting current data corresponding to the current supplied to the part of pixels and signal data corresponding to the gradation pixel data used for the part of pixels,
    wherein the signal data comprises addition data produced by adding the gradation pixel data and the gradation pixel data being delayed by one frame.

2. The video monitoring method according to claim 1, further comprising determining whether or not a video of the gradation pixel data is displayed using the current data and the signal data.

3. The video monitoring method according to claim 2, wherein it is determined that the video of the gradation pixel data is displayed when the current data matches the signal data.

4. The video monitoring method according to claim 1, wherein the part of pixels includes pixels aligned in a line within the plurality of pixels.

5. The video monitoring method according to claim 1, wherein the current data is produced by normalizing the current.

6. The video monitoring method according to claim 1, wherein the signal data is produced by normalizing the addition data.

7. The video monitoring method according to claim 1, wherein the current is detected in a predetermined time within a detected frame of the gradation pixel data, and wherein upon detecting the gradation pixel data, a variation of a signal level for each pixel is detected by comparing the detected frame and a reference frame relative to the detected frame.

8. The video monitoring method according to claim 7, further comprising:
    inputting a video signal to the display; and
    generating the gradation pixel data based on the video signal,
    wherein the predetermined time is a horizontal period of the video signal.

9. The video monitoring method according to claim 1, further comprising determining whether or not a status of a video signal input to the display matches a status of an input video signal.

10. The video monitoring method according to claim 1, wherein the current data and the signal data are output and written on a storage medium.

11. The video monitoring method according to claim 1, wherein the current comprises a current consumed to display the gradation pixel data.

12. The video monitoring method according to claim 1, further comprising determining whether or not a lighting status of a backlight attached to the display is correct.

13. A display device comprising:
    a signal detector configured to detect gradation pixel data input to a display having a plurality of pixels;
    a current detector configured to detect a current supplied to part of pixels among the plurality of pixels; and
    an output part configured to output current data corresponding to the current supplied to the part of pixels and signal data corresponding to the gradation pixel data used for the part of pixels,
    wherein the signal data comprises addition data produced by adding the gradation pixel data and the gradation pixel data being delayed by one frame.

14. A display system comprising:
    a video transmission part configured to output a video signal;
    a signal detector configured to detect gradation pixel data included in the video signal input to a display having a plurality of pixels;
    a current detector configured to detect a current supplied to part of pixels among the plurality of pixels; and
    an output part configured to output current data corresponding to the current supplied to the part of pixels and signal data corresponding to the gradation pixel data used for the part of pixels,
    wherein the signal data comprises addition data produced by adding the gradation pixel data and the gradation pixel data being delayed by one frame.

* * * * *